United States Patent [19]

Cronyn

[11] 4,318,369
[45] Mar. 9, 1982

[54] RECYCLABLE-FUEL ENGINE SYSTEM

[76] Inventor: Marshall W. Cronyn, 3232 NW. Luray Ter., Portland, Oreg. 97210

[21] Appl. No.: 46,120

[22] Filed: Jun. 6, 1979

[51] Int. Cl.³ ............................................. F02B 43/08
[52] U.S. Cl. ................................ 123/3; 123/DIG. 12; 252/416
[58] Field of Search ............... 123/1 A, 3, DIG. 12; 252/416

[56] References Cited

U.S. PATENT DOCUMENTS

| | | | |
|---|---|---|---|
| 2,934,493 | 4/1960 | Borgerson | 208/140 |
| 3,248,338 | 4/1966 | Decker | 252/416 |
| 3,973,524 | 8/1976 | Rubin | 123/3 |
| 4,033,133 | 7/1977 | Houseman | 123/3 |
| 4,037,568 | 7/1977 | Schreiber | 123/DIG. 12 |
| 4,088,450 | 5/1978 | Kosaka | 123/DIG. 12 |
| 4,099,489 | 7/1978 | Bradley | 123/DIG. 12 |

FOREIGN PATENT DOCUMENTS 813645 7/1955 United Kingdom ............... 252/416

OTHER PUBLICATIONS

"Study of Automotive Storage of Hydrogen", E.R.-D.A. by Suitan & Shaw, 6/75, TEC-75/003.

Primary Examiner—Ronald B. Cox
Attorney, Agent, or Firm—Kolisch, Hartwell & Dickinson

[57] ABSTRACT

A recyclable-fuel engine system designed for use in a vehicle. The system includes a hydrogen-producing catalytic unit having plural catalytic beds, and a hydrogen-fueled engine having combustion and exhaust chambers. The catalytic beds, when supplied with heat, catalyze a reduced form of a hydrocarbon carrier to hydrogen and a dehydrogenated form of the carrier. One of the catalytic beds is supplied heat by direct heat transfer from the engine's exhaust chamber. The remaining catalytic beds are supplied heat by heat pipes receiving heat from the combustion and exhaust chambers. The hydrogen produced in the catalytic unit is supplied to the engine, to power the same. Also disclosed herein are apparatus and method for regenerating the catalytic beds periodically.

13 Claims, 8 Drawing Figures

RECYCLABLE-FUEL ENGINE SYSTEM

BACKGROUND AND SUMMARY OF THE INVENTION

The present invention pertains to a recyclable-fuel engine system, and in particular to a system adapted for use with a motor vehicle.

The feasibility of using a recyclable-fuel engine system in a motor vehicle has been studied by the Exxon Research and Engineering Company, Linden, N.J., under Environmental Protection Agency contract #68-02-2135. A copy of the Exxon study is available from the National Technical Information Service, U.S. Department of Commerce, Springfield, Va., 22161, as technical bulletin TEC-75/003. The system proposed by the Exxon Company includes an internal combustion engine and a catalytic reactor which is supplied heat from engine exhaust gases. The catalytic reactor is a shell and tube type unit whose plural tubular bed surfaces are coated with a suitable catalyst, such as platinum. When supplied with heat, the catalyst functions to catalyze the dehydrogenation of a saturated carrier hydrocarbon, such as methylcyclohexane to hydrogen and an unsaturated form of the carrier, such as toluene. The hydrogen produced is used to power the engine, with the unsaturated form of the carrier being returned to the fuel tank, to be replaced, periodically, with saturated carrier.

A significant problem brought out in the Exxon study is that a catalytic reactor of the type proposed therein would require a warmup period in excess of about twenty minutes before reaching operative catalytic temperature. During the warmup period, the engine would have to be supplied stored hydrogen, requiring heavy on-board pressure storage tanks in a vehicle. Another problem identified in the Exxon study is the requirement for excess hydrogen used to supply heat to the catalytic reactor after reactor warmup, to compensate for the endothermicity of the dehydrogenation reaction used to produce the hydrogen fuel in the vehicle. The Exxon study estimates that the amount of heat supplied to the reactor from engine exhaust gases would be about two-thirds of the total heat needed to drive the catalytic reaction at a "self-sustaining" hydrogen production level. The study concludes that nearly half of the total available fuel in the system would be used in supplying additional heat to the catalytic unit, either during warmup or during normal catalytic reactor operation. The additional fuel weight and hydrogen storage tank weight thus required seriously limit the efficiency of the proposed Exxon system.

Another problem which is anticipated in a recyclable-fuel engine system using dehydrogenation catalysis is a gradual loss in reactor catalytic activity due to the deposition of breakdown fragments on the catalytic bed. In the usual large-scale catalytic dehydrogenation operation, this problem is solved by performing the catalytic reaction at elevated hydrogen pressure, typically between 10 and 20 atm. Such pressure is suitable, of course, in commercial applications where an ample supply of hydrogen and energy to drive a pressure-generating pump are available, and where the weight of such pump and the required pressure-containment system is not critical. However, the same factors make the high-pressure system inappropriate for use in a vehicle.

There is a further consideration which makes the use of a high pressure system impractical for vehicle use. As is known, most organic lubricants become unstable above 400° C., thus placing an upper limit on the temperature which the engine block is allowed to reach. For the hydrocarbon carrier molecules proposed herein, the temperature at which the dehydrogenation reaction is strongly favored, between about 1 and 6 atm, is 380° C., or lower. At a pressure of between 10 and 20 atm, the temperature required to produce the same degree of dehyrogenation may be as high as 430° C. Thus, it can be appreciated how a high pressure dehydrogenation system would produce intractable engine lubrication problems.

A general object of the present invention is to provide a recyclable-fuel engine system which solves or minimizes the above-discussed problems in recyclable-fuel engine systems adapted for use in a vehicle.

An important specific object of the invention is to provide, in a recyclable-fuel system, a catalytic unit designed to catalyze the dehydrogenation of a hydrocarbon carrier at low pressure, and apparatus for periodically regenerating the catalytic activity of the unit's catalyst.

Another object of the present invention is to provide, in a recyclable-fuel system including a catalytic unit and an internal combustion engine having combustion and exhaust chambers, heat transfer from both of these chambers to the unit.

Specifically, and related to the above, it is an object to provide in such a system, a plurality of heat pipes for transferring heat from the engine's combustion and exhaust chambers to the catalytic unit.

Yet another object of the invention is to provide, in a recyclable-fuel engine system, a catalytic unit which includes a plurality of catalytic beds, at least one of which can be brought to catalytic temperature independently of the other beds.

The present invention is a recyclable-fuel engine system which includes a hydrogen-utilizing internal combustion engine and a hydrogen-producing catalytic unit. The engine includes combustion and exhaust chambers which are heated by combustion and exhaust gases, respectively. The catalytic unit includes an enclosure housing at least a pair of catalytic beds, each of which functions, when supplied with heat, to catalyze the reaction of a reduced form of a hydrocarbon carrier to hydrogen and a dehydrogenated form of the carrier. Heat may be transferred directly from the exhaust chamber to one of the beds within the catalytic unit, to supply the same with heat during catalyst warm-up. The remainder catalytic beds are supplied heat by heat pipes connecting the combustion and exhaust chambers thereto.

The dehydrogenation reaction occurring within the catalytic unit is performed at a temperature of between 300° and 380° C., at a pressure of about one atmosphere of hydrogen. Under these reaction conditions, there occurs a deposit of carbonaceous material, including fragments of the carrier, on the catalytic beds, reducing the catalytic activity thereof. The deposit is oxidized, to regenerate the catalytic activity of the beds, by periodically and selectively evacuating the catalytic unit enclosure and introducing air thereinto.

These and other objects and features of the present invention will become more fully apparent when considered in connection with the following detailed description of a preferred embodiment of the invention and the accompanying drawings, wherein:

DETAILED DESCRIPTION OF A PREFERRED EMBODIMENT OF THE INVENTION

Figures 1, 2:
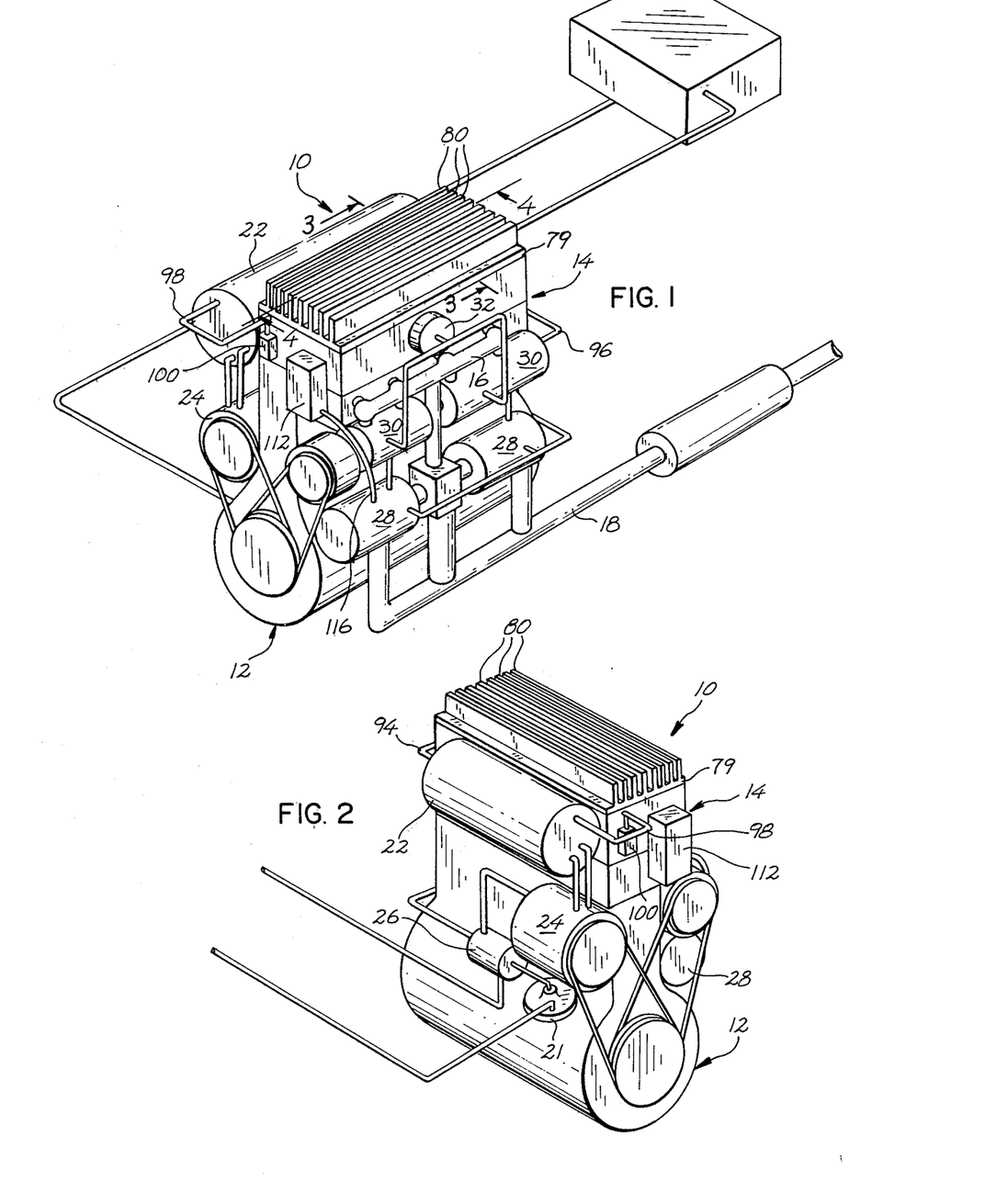
FIG. 1 is a perspective view of a recyclable-fuel engine system constructed according to a preferred embodiment of the present invention.
FIG. 2 is another perspective view of the system shown in FIG. 1.

Describing the present invention very generally, and first with reference to FIGS. 1 and 2, at 10 is shown a recyclable-fuel engine system constructed according to a preferred embodiment of the invention. System 10 includes an internal combustion engine 12, which is adapted to use hydrogen as its fuel source, and a catalytic unit 14, which when supplied with heat, is operable to catalyze the reaction of a saturated hydrocarbon carrier to hydrogen and a dehydrogenated form of this carrier. Heat is supplied to unit 14 by heat transfer from combustion and exhaust gases produced during engine operation, as will be described. Engine exhaust gases are collected in an exhaust manifold 16 and vented through an exhaust system including an exhaust pipe 18.

Saturated hydrocarbon carrier is stored as a liquid in one compartment of a two-compartment fuel tank 20, and supplied to unit 14 by a carrier-supply system including a fuel pump 21 (FIG. 2). The carrier is catalytically converted, in unit 14, to a stream of heated gas containing hydrogen and a reduced form of the carrier. The stream components are phase-separated by a hydrogen-supply system including a heat-exchanger 22, a compressor 24 and a condenser 26 (FIG. 2), with production of condensed carrier and pressurized hydrogen. The condensed, dehydrogenated carrier is returned to the other compartment of tank 20.

The hydrogen-supply system further includes a pair of gas-filtration tanks 28 through which the pressurized hydrogen is passed and thus purified. Purified, pressurized hydrogen is supplied to a fuel injector 32, where it is mixed with air and injected into the engine. The purified, hydrogen gas may also be supplied, under the control of a valving system to be described, to one of a pair of hydrogen-storage tanks, shown here at 30.

Figure 3:
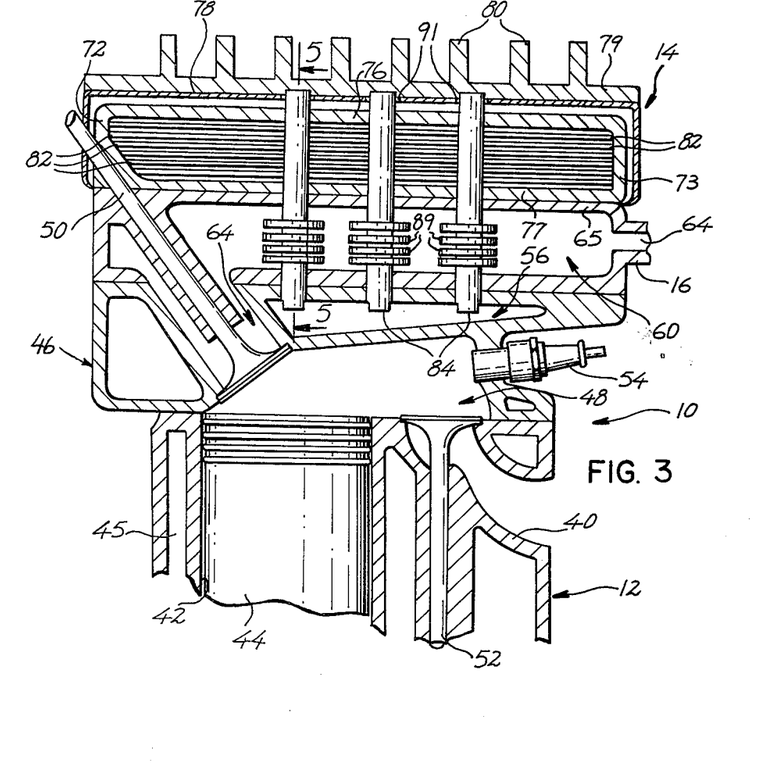
FIG. 3 is an enlarged sectional view of a catalytic unit and portion of an engine taken generally along line 3—3 in FIG. 1.

Considering now details of the invention, with reference particularly to FIG. 3, engine 12 includes an engine block 40 having defined therein plural piston cylinders, such as cylinder 42, in which pistons, such as piston 44, reciprocate. Block 40 is cooled conventionally during engine operation, by a coolant, such as water, circulating through a heat jacket 45 surrounding the piston cylinders.

An engine head 46 attached to and sealing the upper surface of block 40 in FIG. 3, provides, for each cylinder 42, a combustion chamber 48 communicating with the upper end of the associated cylinder, as shown. Fuel and exhaust gas porting for chamber 48 includes an exhaust valve 50, and an intake valve 52, which are conventionally operated. Head 46 also mounts plural spark plugs, such as plug 54, one for each combustion chamber. Heat from gases within each engine combustion chamber is transferred to a coolant contained within an elongate sealed cavity, shown cross-sectionally at 56. Heat is transferred from this coolant to catalytic unit 14, in a manner to be described.

Head 46 also provides a plurality of exhaust chambers, such as chamber 60 in FIG. 3, each of which communicates with an associated chamber 48, through an associated valve-controlled exhaust port 62. The exhaust chamber is vented through vent port 64 into manifold 16, shown in FIG. 1 and fragmentarily in FIG. 3. Heat from exhaust gases within the engine's exhaust chambers is transferred to unit 14 in a manner to be described. The exhaust chamber's upper wall 65 has formed on its lower surface, a catalytic bed, indicated by a saw-tooth line at 66 in FIGS. 4 and 5. The catalytic bed functions to catalyze the oxidation of hydrogen under controlled, non-explosive conditions, for a purpose to be described.

Figure 4:
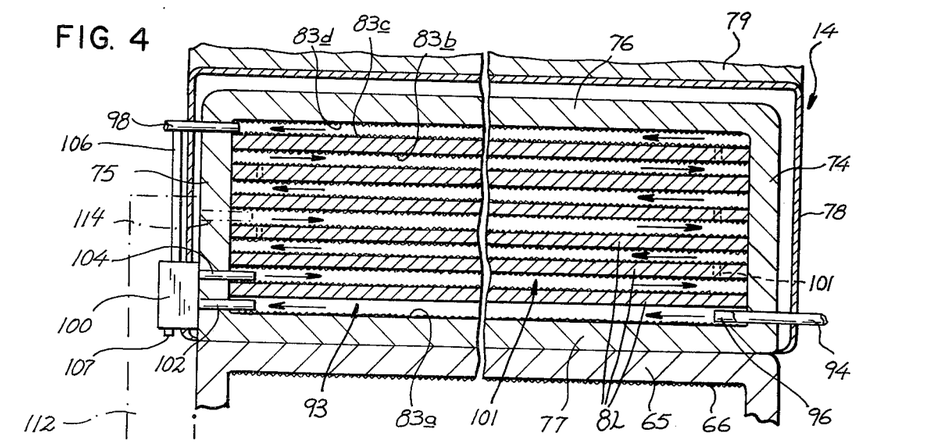
FIG. 4 is an enlarged, foreshortened sectional view of the catalytic unit shown in FIG. 1, taken generally along line 4—4 in the figure.

Catalytic unit 14 includes an enclosure 68 which is shown cross-sectionally in FIGS. 3 and 4. The enclosure is a sealed metal structure having side walls 72, 73 (FIG. 3), end walls 74, 75 (FIG. 4) and top and bottom walls 76, 77, respectively. The enclosure is encased in an insulated jacket 78. A heat-transfer unit 79 including a plurality of cooling fins, such as fins 80 is carried on the upper surface of jacket 78, for a purpose to be described. A plurality of metal plates, such as plates 82, are mounted in spaced-apart, parallel relationship within the enclosure. These plates are attached at their edges to walls 72, 73, 74, 75.

Figure 5:
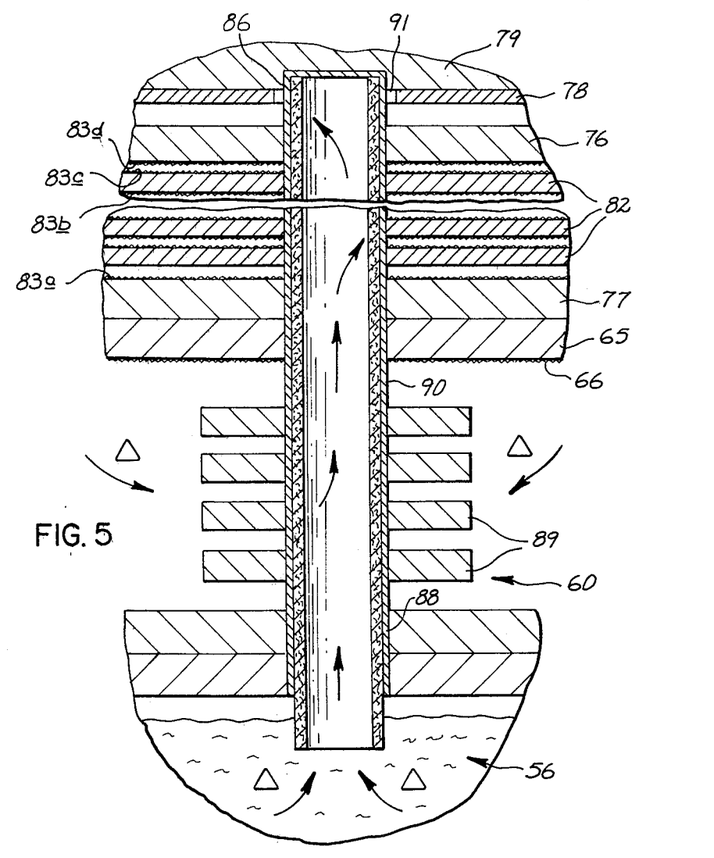
FIG. 5 is an enlarged sectional view of a heat pipe and associated structure shown in FIG. 3, taken generally along line 5—5 in this figure.

Referring to FIGS. 4 and 5, the interior surface of top and bottom walls 76, 77, respectively, and the lower and upper surfaces of plates, such as plates 82, are coated with a suitable catalyst, forming thereon catalytic surfaces or beds, such as beds 83a, 1 83b, 83c, and 83d, indicated by saw-tooth lines in FIGS. 4 and 5. It is noted here that the lower surface of plate 82 adjacent wall 77 is not coated with a catalyst, for a reason which will become clear below. The catalytic beds within unit 14 are formed of catalytic particles which are deposited on, or bonded to the associated metal plate surfaces by conventional techniques. These particles are preferably alumina coated with 0.1% to 1% platinum or palladium. Other suitable catalytic particles or coatings may also be employed. In particular, it is noted that the catalytic particles employed in unit 14 may be catalyst-coated alumina pellets which are deposited into, and fill the interplate spaces and the spaces between upper and lower plates 82 and the adjacent housing walls 76, 77, respectively, within unit 14. The catalytic beds within unit 14 are also referred to herebelow as catalytic means operable, when supplied with heat, to catalyze the reaction of a reduced form of a hydrocarbon carrier to hydrogen and a dehydrogenated form of this carrier. The catalytic particles forming the catalytic beds in unit 14 are also suitable for forming bed 66 in exhaust chamber 60.

Heat transfer from the engine combustion and exhaust chambers to the catalytic beds just-described is effected by a plurality of heat pipes, such as pipes 84, seen in FIGS. 3 and 5. The three heat pipes shown in FIG. 3 represent one of a cluster of laterally-aligned pipes which are longitudinally spaced along the long axis of the engine, i.e. the axis normal to the plane of FIG. 3. Referring to FIG. 5, each heat pipe 84 is formed of a tube 85 having upper and lower portions 86, 88, respectively, and a central portion 90 disposed within exhaust chamber 60. Portion 90 carries a plurality of annular heat-exchange fins, such as fins 89. Tube 85 is open at its lower end, and closed at its upper end in this figure. The interior of the tube is lined with a liquid-flow support, formed of wire mesh or the like, indicated at 92. The support may act as a wick to draw liquid from cavity 56 into portion 90, by capillarity, or as a support for liquid flow between portion 88 and the cavity.

Considering the mounting of each heat pipe within apparatus 10, and with continued reference to FIG. 5, portion 86 extends through walls 65, 77, plates 82, and upper wall 76, and is in heat-exchange contact with each. Portion 86, where the same extends through jacket 78, is insulated therefrom by an annular sleeve 91. The closed upper end of portion 86 terminates within a suitable well in unit 79, and is thus in heat-exchange contact with fins 80. Portion 88 extends through the two plates separating cavity 56 and chamber 60 and terminates adjacent the upper surface of cavity 56. The lower end of support 92 extends into cavity 56, below the level of liquid coolant therein.

With reference to FIG. 3, heat pipes 84, the lower open ends of which communicate with cavity 56, form therewith a sealed system containing a coolant within the cavity and a pressurized, noncondensable gas in the upper portion of the cavity and interior portion of each heat pipe. A preferred coolant contained within cavity 56 is dixylylethane which has a boiling point, at atmospheric pressure, of about 315° C. The pressure within pipes 84 is such that the coolant boils preferably at about 350° C.

Describing the mechanics of heat transfer through a pipe 84, heat transferred from heated combustion gases within the engine combustion chambers to the coolant in cavity 56, causes the same to volatilize, and rise toward the upper portion of the heat pipe. Here the vapor condenses, with the heat of condensation being transferred to plates 82 and walls 76, 77. The condensate within the pipe collects in support 92 and flows therein toward the lower portion of the heat pipe, back into cavity 56. Concurrent with the just-mentioned liquid/vapor cycle which transfers heat between portions 86, 88, heat from exhaust gases within chamber 60 is collected by fins 89 and transferred to portion 90, with such heat producing volatilization of a portion of the condensate in support 92 lining the interior of portion 90. The volatilized gas in portion 90 rises, condenses within portion 88, and returns as condensate via support 92, creating a liquid/vapor cycle between portions 86, 90, thus to transfer heat therebetween.

Pipe portions 88, 90, which receive heat from the engine combustion and exhaust chambers, respectively, form a heat-input portion in the pipe where inputted heat is used in volatilizing a liquid contained therein. Portion 86, which is connected in heat-exchange relationship with the catalytic beds unit 14 forms a heat-output portion in the pipe where heat is released by condensation of heated gas. Pipe 84 is illustrative generally of heat pipe means which function in the just-described manner to cycle a fluid in a sealed system between liquid and gaseous phases at heat-input and heat-output portions, respectively. Walls 65, 77, across which heat transfer occurs between chamber 60 and catalytic bed 83a in unit 14, is also referred to herebelow as plate means, interposed between chamber 60 and bed 83a for transferring heat from the former to the latter. The lower surface of wall 65 is also referred to as a heat-transfer surface. Heat pipes 84, and the just-mentioned plate means are also referred to herebelow, collectively, as heat-transfer means. Catalytic bed 83a, which is heatable by heat transfer across walls 65, 77, is also referred to herebelow as a first catalytic bed. The remaining catalytic beds within unit 14, including beds 83b, 83c, 83d, which are heatable by heat transfer from pipes 84, are also referred to herebelow as a second catalytic bed.

Figure 7:
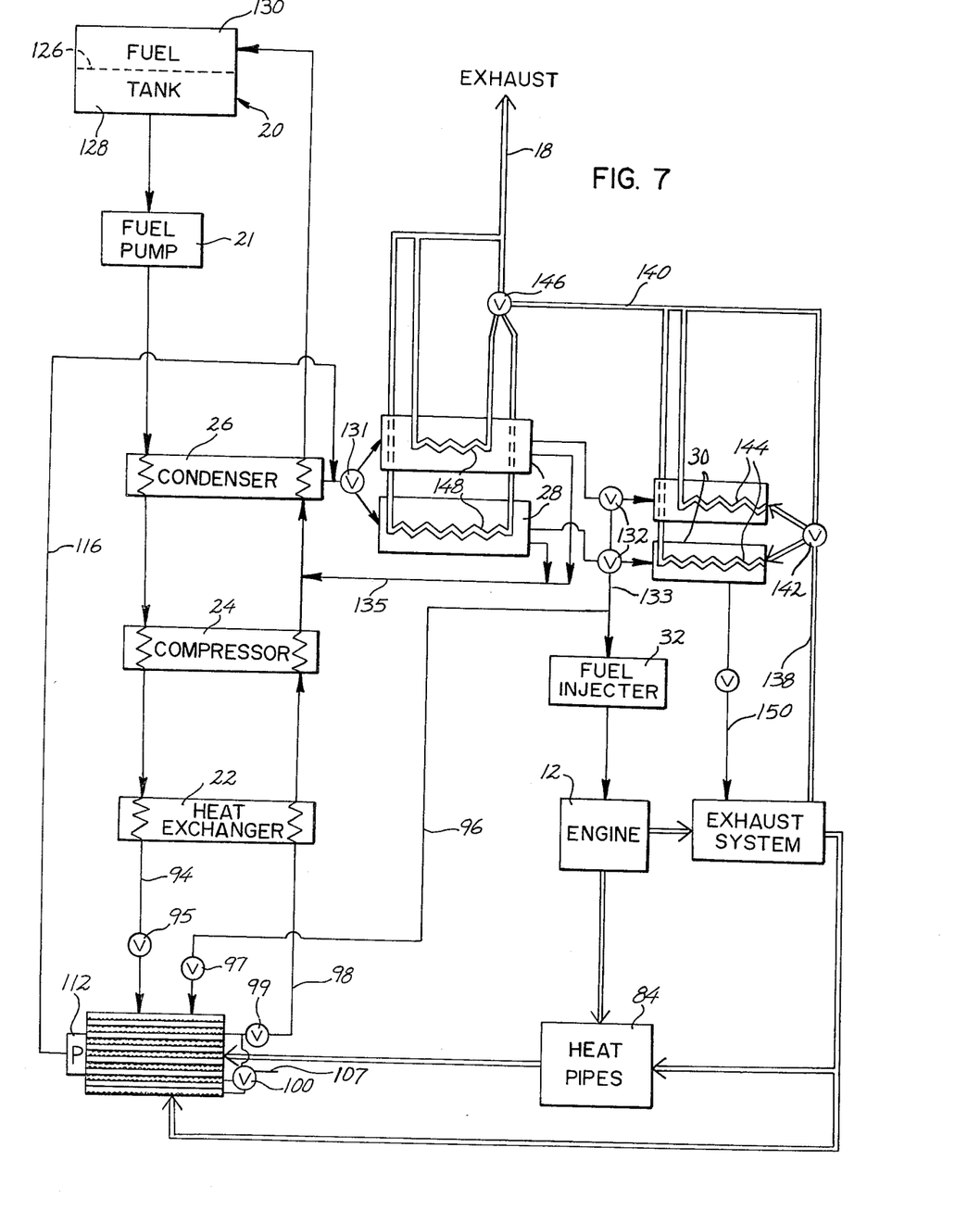
FIG. 7 illustrates the system of the present invention in diagrammatic form.

Viewing FIG. 4, reduced liquid carrier is supplied to unit 14, by the above-mentioned carrier-supply system, through a conduit 94. Hydrogen is supplied to this unit through a conduit 96, by the above-mentioned hydrogen-supply system. Conduits 94, 96 discharge into a lower space 93 defined between lower wall 77 and adjacent plate 82, at the right portion of this space in the figure. The heated stream of gases produced within unit 14 is discharged through a conduit 98, at the upper left portion of unit 14 in FIG. 4. Fluid flow through conduits 94, 96, 98 is controllable by valves 95, 97, and 99, respectively (FIG. 7).

While not shown, space 93 may be partitioned, by suitable dividers between wall 77 and adjacent plate 82, to guide gases within this space in a serpentine pathway as the gases travel in a generally right-to-left direction in FIG. 4. Similar dividers may be employed between each pair of adjacent plates 82, and between uppermost plate 82 and wall 76, also to direct gases traveling through associated spaces between these plates, along generally serpentine pathways.

The fate of heated reactant gases produced within the catalytic unit's lower space 93, by passage across catalytic bed 83a, is determined by a three-position valve 100 attached at the left side of unit 14 in FIG. 4. Valve 100, in a first condition, connects space 93 with conduit 98, through a valve port 102 and a conduit 106. The first valve condition is produced when the temperature of the plate 82 adjacent wall 77, as sensed by a heat-sensitive plate switch (not shown), is below a preselected temperature, characteristically about 350° C. In a second valve condition, valve 100 connects space 93 and an adjacent interplate space 101 within unit 14 through valve ports 102, 104, respectively. The valve is placed in its second position when the just-mentioned plate 82 reaches such preselected temperature. In a third valve condition, the valve connects conduit 106 and port 102 with an exterior port 107 communicating with the atmosphere, allowing air to be drawn into unit 14, for a purpose to be described.

Gas supplied to space 101 through port 104 follows a serpentine pathway within this space in a generally left-to-right direction. When the gas reaches the right end of space 101, it passes through a plate-connecting opening 110 formed in the plate overlying space 101, and into the space immediately adjacent and above space 101. The gas continues to move through unit 14, in this manner and as indicated by the arrows in FIG. 4, until the gas reaches return conduit 98 at the left end of the uppermost catalytic space within the unit.

With continued reference to FIG. 4, a pump, shown in phantom lines at 112, and attached to the left side of unit 14 in this figure, communicates with the interior of enclosure 68 through a port shown in phantom lines at 114. Pump 112, when actuated, functions to evacuate unit 14, with the evacuated gases being supplied to one of tanks 28, through a conduit 116, as seen in FIGS. 1 and 7. Alternatively, pump 112 can be placed in an operating position wherein port 114 communicates with the atmosphere. The latter position is produced concurrently with the switching of valve 100 to its above-described third condition, wherein port 102 and conduit 98 communicate with the atmosphere, through a port 107. It can be appreciated that with pump 112 and valve 102 in the just-described positions, the pump functions to draw air, supplied through port 107, through the upper and lower portions of the unit 14, and to evacuate such air into the atmosphere. Pump 112, when operated in its mode supplying evacuated gases to conduit 116, is also referred to herebelow as evacuating means operable to evacuate gases from the catalytic unit enclosure. Pump 112 and valve 100, when switched to conditions wherein air is pumped through the chamber, as just described, is also referred to herebelow as oxygen-supply means selectively operable to supply oxygen to this housing. The just-mentioned evacuating and oxygen-supply means are also referred to herebelow, collectively, as regenerating means for producing, selectively and periodically, oxidation of carbonaceous material on the catalytic beds, thus to regenerate the activity of same.

Figure 6A:
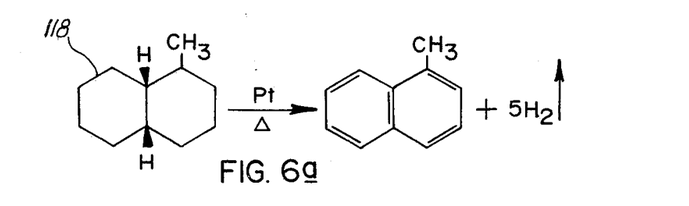
FIGS. 6a and 6b show dehydrogenation reactions for two hydrocarbon carrier molecules proposed for use in the present invention.
Figure 6B:
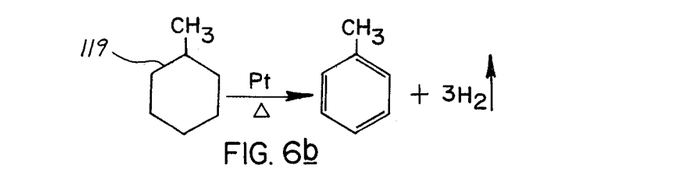

A suitable hydrogenated carrier for use in the present invention is a one- or two-ring hydrocarbon compound such as a cis-methyldecalin, shown at 118 in FIG. 6a, or methylcyclohexane, shown at 119 in FIG. 6b. As indicated in these figures, carriers 118, 119 are catalytically converted, in the presence of a catalyst such as platinum or palladium, and heat, to hydrogen and the corresponding unsaturated carrier molecules, cis-methylnaphthalene and toluene, respectively. At temperatures above 300° C., and at atmospheric pressure, dehydrogenation of the hydrogenated carriers is favored, and at temperatures of about 350° C., is strongly favored.

Describing now carrier-storage in apparatus 10, with reference particularly to FIG. 7, fuel tank 20 includes a sealed enclosure having a flexible divider 126 which partitions the interior of the enclosure into two variable-volume compartments 128, 130. These two compartments contain the reduced and the dehydrogenated carrier, respectively. When reduced carrier is supplied to tank 20, partition 126 moves to expand the volume of chamber 128 to fill substantially the entire volume of the tank. During vehicle operation, as the carrier within chamber 128 is used up, and spent carrier is returned to chamber 130, the partition again moves, in the opposite direction, to accommodate the increasing volume within chamber 130, and the corresponding decreasing volume within chamber 128. Apparatus 10 is "refueled" by removing the spent carrier in chamber 130, and refilling chamber 128 with the reduced carrier.

The flow of carrier from chamber 128 to unit 14 and back to chamber 130 is shown schematically in FIG. 7. In particular, it is seen that fuel supplied to unit 14, by pump 21, is heated in passage through condenser 26, compressor 24, and heat exchanger 22. The heated gas stream produced within unit 14 passes from conduit 98, through heat exchanger 22 and into compressor 24, where the gas stream is compressed to a pressure of between 10 to 20 atmospheres. The compressed gas is then supplied to condenser 26, where the hydrocarbon carrier is condensed and separated from the pressurized gaseous hydrogen. Pump 21, compressor 24, and heat exhanger 22 are all of conventional design, as is condenser 26 which is a conventional liquid/gas-phase separator.

Pressurized hydrogen gas is fed from condenser 26, under the control of a two-position valve 131, to one of the two gas-filtration tanks 28. These tanks contain hydrocarbon-adsorbing material such as zeolite, for adsorbing any hydrocarbon contaminates in the hydrogen gas flowing through the tanks. Hydrocarbon contaminates adsorbed on the zeolite may be periodically and selectively desorbed or released, by heating the zeolite, in a manner to be described. The desorbed hydrocarbon material, which includes primarily the dehydrogenated form of the fuel carrier, is recirculated through condenser 26, via a conduit 135, and from the condenser, is returned to compartment 130. Tanks 28 are also referred to herebelow as adsorbing means for adsorbing hydrocarbon contained in the gas collected from the condenser.

The filtered, pressurized hydrogen gas exiting from tanks 28 may be supplied selectively, under the control of a pair of three-position valves 132, to either hydrogen-storage tank 30. Hydrogen is stored in tanks 30 on metal hydride beds, which function to bind hydrogen, when the same is supplied to the tanks under pressure. Hydrogen is releasable from the hydride beds, when the pressure within the tanks is reduced, and the beds are heated, in a manner to be described. Tanks 30 are also referred to herebelow as temperature-sensitive storage means. Compressor 24, condenser 26 and tanks 28, 30 are also referred to herebelow, collectively, as hydrogen supply means. Valves 132 also control the supply of hydrogen to a conduit 133 which supplies hydrogen to injector 32. Hydrogen within conduit 133 is also supplyable to catalytic unit 14, under the control of valve 97, via conduit 96.

Heat-transfer pathways utilized in system 10, including portions of the exhaust system now to be described, are indicated in FIG. 7 in double lines. As indicated above, with reference to FIG. 3, exhaust gases from the engine exhaust chambers are received in manifold 16. As seen in FIG. 7, these gases communicate with pipe 18 through conduits 138, 140. Gas flow between the two just-mentioned conduits is controlled by a three-position valve 142 which is selectively operable to shunt gases from conduit 138 to either one of tanks 30. The exhaust gas passageway through each tank 30 is a coiled heat-transfer tube 144 which functions to transfer heat from exhaust gases within the tube to the hydride beds within the associated tanks. Heating of the hydride beds causes the hydrogen stored thereon to be released, wherein the gas may be supplied to one of the hydrogen-utilizing components of system 10. Valve 142 and the heat-exchange tubes within tanks 30 supplied by this valve are also referred to herebelow as release means.

Similarly, exhaust gas flow between conduit 140 and exhaust pipe 18 is controllable by three-position valve 146 which is operable to divert gas from conduit 140 through one of the two filtration tanks 28. The exhaust gas passageway through each tank 28 is a coiled heat-transfer tube 148, which functions to transfer heat from exhaust gases within the tube to the zeolite filtration material, to effect release of hydrocarbon contaminates adsorbed thereon. Valve 144 and the heat-exchange tubes within tanks 28 supplied by this valve are also referred to herebelow as desorbtion means for releasing desorbed material from the filter.

System 10 further includes an electronic control unit for controlling, in a manner described below, selected components of system 10. The design and construction of the control unit is conventional, and would be known to one skilled in the art.

The operation of the above-described apparatus will now be considered. Engine 12, with such in a cold condition, is initially fueled by hydrogen supplied from one of tanks 30, through injector 32, which functions to mix the hydrogen with air and inject the mixture into the engine. One feature of a hydrogen-fueled engine is that the engine can operate, both during engine warm-up and when the engine has reached a final operating temperature, on a lean mixture of hydrogen and air. In the system described herein, the fuel/air mixture injected into the engine during engine warm-up contains excess air, for a purpose to be described.

According to one important feature of the present invention, a portion of the catalytic capacity of unit 14 can be brought into play during early engine warm-up. This is accomplished by heating a first catalytic surface—namely catalytic bed 83a—to catalytic temperature independently of, and prior the heating to catalytic temperature of a second catalytic surface, including the remaining catalytic beds within unit 14. Bed 83a is heated during initial engine warm-up by heat transfer from chamber 60 across walls 65, 77. This heat is supplied by combustion gases produced within chamber 60 during engine operation, and by the catalytic oxidation of hydrogen, on catalytic surface 66, on the lower surface of plate 65 (FIG. 5). The hydrogen utilized in the just-mentioned reaction is supplied to chamber 60 from storage tank 30, through a valve-controlled conduit 150, as shown in FIG. 7, under control of the control unit. Oxygen utilized in this reaction is that contained in the exhaust gases, by virtue of the lean fuel mixture employed. The amount of heat obtained by the oxidative combustion of a quantity of hydrogen is roughly three times the amount of heat which must be supplied to catalytic unit 14, to produce therein the same quantity of hydrogen. Thus, the hydrogen supplied to the exhaust chamber, during initial warm-up, yields, through heat-transfer to unit 14, a substantially greater amount of hydrogen for use during such warm-up.

When the temperature of bed 83a in unit 14 has reached catalytic temperature, as determined by a suitable heat-sensing mechanism on this bed, the control unit operates to terminate the supply of hydrogen to chamber 60 and initiate the supply of hydrogen to unit 14, to maintain hydrogen pressure therein between 1 and 6 atm, and preferably about 1 atm. Concommitantly, the control unit operates to supply the hydrogenated carrier fuel, through conduit 94, to catalytic unit 14. The hydrogenated carrier supplied to unit 14 is catalytically converted, in its passage across heated plate 83a, to a heated stream of gas containing catalytically-produced hydrogen and the dehydrogenated form of the carrier. The heated reactant gases so produced are vented through port 102 and shunted, by valve 100, to conduit 98. The hydrogen collected from the heated gas stream exiting from conduit 98 is then phase-separated, filtered, and supplied to engine 16 or to hydrogen storage tanks 30, as has been described.

Continued heat transfer from the heated combustion gases within the engine's combustion chambers to the coolant within cavity 56, during engine warm-up, heats such coolant to its boiling temperature, preferably about 350° C. At this temperature, a liquid/vapor cycle occurring within the heat pipes produces heat transfer from the liquid within cavity 56 to plates 82 and walls 76, 77, as described. A portion of the condensed liquid produced by this cycle, and returning, in each pipe, through support 92 within portion 90, is vaporized by heat transferred from the heated exhaust gases within the exhaust chambers, wherein heat is transferred therefrom to the above-mentioned plates and walls.

When plate 82 adjacent wall 77 has reached a preselected catalytic temperature, e.g. about 350° C., the control unit functions to switch valve 100 to a condition connecting ports 102, 104 wherein hydrogen and reduced carrier fuel supplied to the catalytic unit are carried over all of the catalytic beds contained therein. Concommitantly, the control unit functions to increase the supply of carrier fuel and hydrogen to the catalytic unit to match the increased catalytic capacity of the unit, with all its catalytic surfaces being utilized, and to maintain the heated gas stream within the catalytic unit under a hydrogen pressure of about one atmosphere.

Continued heat transfer to unit 14 drives the endothermic dehydrogenation reaction occurring therein, with the rate of hydrogen production being related to the rate of engine heat transfer to the unit. Under normal engine load conditions, the rate of hydrogen production is somewhat greater than the rate of hydrogen consumption by the engine. Similarly, under heavy or light load conditions, more or less heat, respectively, will be transferred from the engine to unit 14, and more or less hydrogen, respectively, will thereby be produced. Under load conditions where an excess of hydrogen is produced, the control unit operates to supply such excess to the hydrogen storage tanks. Similarly, when the engine is operating under severe load conditions, such stored hydrogen is supplementally supplied to the engine. Excess heat supplied to unit 14 but not utilized thereby, is dissipated by heat loss from fins 80. The temperature of the unit's catalytic beds is thus maintained at a desired catalytic temperature.

For reasons mentioned above, the low-pressure reaction conditions employed in the operation of unit 14 produce a relatively rapid decay of the unit's catalytic activity. For example, when the unit's beds have been newly regenerated, the catalytic efficiency of the beds is typically between 90% to 95%, and this efficiency may drop to 80% within one-half hour to an hour of operation. It is generally desirable, for purposes of minimizing the amount of catalyst required, to operate the catalytic unit within the two just-mentioned limits, i.e. between about 80% and 95% efficiency.

The catalytic activity of the beds is monitored, by conventional electronic techniques, according to the ratio of hydrogenated to dehydrogenated carrier in the heated gas stream produced in unit 14. As this ratio increases, indicating a decay of the catalytic efficiency of the beds within unit 14, the control unit acts to reduce the supply of hydrogenated carrier to the unit. When the rate of such supply falls to a preselected level, indicative of a lower limit of catalytic efficiency at which the system is allowed to operate, the control unit actuates the system's regenerating means, in a manner now to be described.

Initially, to regenerate the beds within unit 14, the control unit operates to place valves 95, 97, 99 (FIG. 7) in closed conditions and valve 100 in its above-named second position (connecting ports 102, 104), wherein heated gases within the unit are substantially isolated within enclosure 68 (FIG. 3). The pump 112 is actuated to evacuate gases within the catalytic unit and pump the same, via conduit 116 (FIG. 7), into one of tanks 28.

When the hydrocarbon gases have been substantially evacuated from unit 14, pump 112 is placed in a condition interconnecting port 114 with the atmosphere, and valve 100 is placed in a condition connecting port 102 and conduit 98 with the atmosphere, through port 107. As can be appreciated with reference to FIG. 4, and as has been described, this causes air to be drawn into upper and lower portions of the chamber, and circulated across all of the catalytic beds therein, before being evacuated through port 14. The oxygen in the air so introduced reacts with the hydrocarbon fragments on the heated catalytic surfaces to produce rapid and complete oxidation thereof. Typically, such oxidation is complete within a period of about 20 seconds, and is effective to completely regenerate the unit's catalytic beds. Pump 112 is then turned off and valve 100 is placed in its abovenamed second position interconnecting ports 102, 104. The control unit next places valve 97 in an opened condition to introduce hydrogen into enclosure 68, to a pressure of about one atmosphere. Valves 95, 99 are then opened and carrier fuel begins to circulate within unit 14, wherein hydrogen is again being produced within the unit.

The method of regenerating the catalytic beds within unit 14 just-described, is accomplishable in about one minute. As noted above, the catalytic beds within unit 14 are regenerated every 30 to 60 minutes. Thus, the time interruption involved in regenerating the catalytic beds is, at most, about 3% of operational time. During the regeneration period, hydrogen, of course, is supplied to engine 16 from storage tanks 30.

From the foregoing, it can be appreciated how the objects of the present invention are met. First, the heat-pipe construction disclosed herein permits heat from an engine combustion chamber, at one temperature, and heat from an engine exhaust chamber, at a higher temperature, to be transferred to catalytic beds to heat the same to a desired catalytic temperature. This construction increases the amount of heat which can be transferred from the engine to a catalytic unit during operation. The rate of catalyst warm-up and the rate of hydrogen producible by the catalytic unit are thereby increased.

Secondly, the system disclosed herein includes a catalytic unit having first and second catalytic beds which are independently and sequentially heatable, whereby a portion of the catalytic capacity of the catalytic unit can be utilized soon after initial engine operation, to contribute hydrogen fuel to the engine operation during engine and catalyst warm-up. Accordingly, the amount of hydrogen which must be stored by the apparatus, to effect catalyst warm-up, is substantially reduced.

Thirdly, the apparatus and method disclosed herein for effecting rapid and complete regeneration of the catalytic beds within the catalytic unit, permit the latter to be operated under conditions which promote a relatively rapid decay of the catalytic activity of the beds. In particular, the catalytic unit may be operated at low pressures, whereby the weight and energy requirements of the catalytic unit can be substantially reduced.

Finally, as can be appreciated with reference to FIG. 3, the engine system is adaptable for use with existing vehicle engines. With reference to FIGS. 1 and 2, the system is compact enough to be accommodated easily within standard-sized vehicle engine compartments.

A recyclable-fuel engine apparatus suitable for use in motor vehicles has thus been disclosed. It is obvious that various changes and modifications may be made in the apparatus described herein without departing from the spirit of the invention.

It is claimed and desired to secure by Letters Patent:

1. A recyclable-fuel engine system comprising
an internal combustion engine having combustion and exhaust chambers which contain heated combustion and exhaust gases, respectively, during engine operation,
catalytic means operable, when supplied with heat, to catalyze the reaction of a reduced form of a hydrocarbon carrier to hydrogen and a dehydrogenated form of said carrier,
heat transfer means for transferring heat from said combustion and exhaust chambers to said catalytic means, said heat transfer means including heat pipe means having a heat-input portion connected to said combustion and exhaust chambers, for receiving heat therefrom, and a heat-output portion connected to said catalytic means for imparting heat thereto, and
hydrogen supply means for supplying hydrogen produced by said reaction to said engine, to power the same.

2. The system of claim 1, wherein said catalytic means further includes first and second catalytic beds which are arranged to be heated sequentially.

3. The system of claim 2, wherein said heat transfer means includes plate means operatively interposed between said exhaust chamber and said first bed for transferring heat from the former to the latter.

4. The system of claim 1, wherein said catalytic means includes first and second catalytic beds, and said heat transfer means further includes plate means interposed between said exhaust chamber and said first bed for transferring heat from the former to the latter, and said heat-output portion in said heat pipe means is connected to said second bed, for imparting heat thereto.

5. The system of claim 1 which further includes temperature-sensitive storage means for storing under pressure, hydrogen produced by said reaction, and release means operatively connecting said exhaust chamber and said storage means, operable to transfer heated exhaust gases from the former to the latter, to heat said storage means and thus effect release of hydrogen therefrom.

6. The system of claim 1, wherein said fuel-supply means includes a condenser and adsorption means operatively connected to said condenser for receiving gas therefrom and adsorbing any hydrocarbon contaminates therein, and desorption means operatively connecting said exhaust chamber and said adsorption means, operable to transfer heated exhaust gas from the former to the latter, to heat said adsorption means and thus effect release of such contaminates therefrom.

7. A recyclable-fuel engine system comprising
an internal combustion engine having combustion and exhaust chambers which contain heated combustion and exhaust gases, respectively, during engine operation,
a catalytic bed which is operable, when supplied with heat, to catalyze the reaction of a reduced form of a hydrocarbon carrier to hydrogen and a dehydrogenated form of said carrier, with such reaction being performed under conditions which produce a deposit of carbonaceous material on said bed, reducing the catalytic activity thereof,
regeneration means for producing, periodically, oxidation of said deposit, thus to regenerate the catalytic activity of said bed, heat transfer means for transferring heat from said combustion and exhaust chambers to said bed, said heat transfer means including heat pipe means having a heat-input portion connected to said combustion and exhaust chambers, for receiving heat therefrom, and a heat-output portion connected to said bed for imparting heat thereto, and hydrogen-supply means for supplying hydrogen produced by such reaction to said engine, to power the same.

8. The system of claim 7 which further includes an enclosure for said bed, and wherein said regenerating means includes evacuating means operable to evacuate gases from said enclosure, and air supply means operable to supply oxygen to said enclosure under the influence of vacuum produced by said evacuating means.

9. The system of claim 7 wherein said reaction is performed at a temperature of between 300° and 380° C., and at a pressure of between about 1 and 6 atm hydrogen.

10. The system of claim 7 wherein said catalytic bed includes alumina coated with between about 0.1% and 1% of one from the group including platinum and palladium.

11. The system of claim 7 wherein said reduced hydrocarbon carrier includes one from the group including methylcyclohexane and a cis-methyldecalin.

12. A recyclable-fuel engine system comprising an internal combustion engine having combustion and exhaust chambers which contain heated combustion gases and exhaust gases, respectively, during engine operation, first and second catalytic beds, each of which is operable, when supplied with heat, to catalyze the reaction of a reduced form of a hydrocarbon carrier to hydrogen and a dehydrogenated form of said carrier, with such reaction occurring under conditions which produce a deposit of carbonaceous material on said beds, thus reducing the catalytic activity thereof, regeneration means for effecting, selectively and periodically, oxidation of said deposit, thus to regenerate the catalytic activity of said beds, plate means operatively interposed between said exhaust chamber and said first bed for transferring heat from the former to the latter, a heat pipe having a heat-input portion connected to said combustion and exhaust chambers for receiving heat therefrom, and a heat-output portion connected to said second bed for imparting heat thereto, and hydrogen supply means for supplying hydrogen produced by such reaction to said engine, to power the same.

13. The system of claim 12 which further includes an enclosure housing said first and second catalytic beds, and wherein said regenerating means includes evacuating means operable to evacuate gases from said enclosure and oxygen supply means operable to supply oxygen thereto.

* * * * *